J. OSTERMEIER
Dec. 6, 1932. FLASH LAMP Re. 18,678
Original Filed April 5, 1929
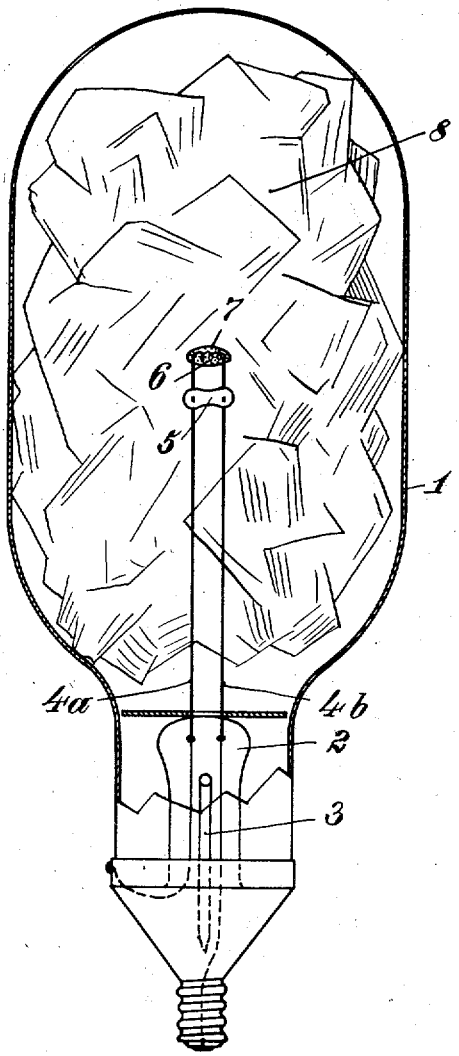
Inventor:
Johannes Ostermeier
By Louis Gaudelka
Attorney.

Reissued Dec. 6, 1932

Re. 18,678

UNITED STATES PATENT OFFICE

JOHANNES OSTERMEIER, OF ALTHEGNENBERG, GERMANY, ASSIGNOR, BY MESNE ASSIGNMENTS, TO GENERAL ELECTRIC COMPANY, A CORPORATION OF NEW YORK

FLASH LAMP

Original No. 1,776,637, dated September 23, 1930, Serial No. 352,705, filed April 5, 1929, and in Germany February 28, 1929. Application for reissue filed August 9, 1932. Serial No. 628,758.

The invention relates to flash lamps, more particularly those intended for photographic purposes. Flash lamps are already known in which an oxidizable metal in the form of wire or ribbon or a flash mixture is lodged in a gas-tight transparent bulb which contains a filling of oxygen, of an oxygen-gas mixture, or of a gas that gives off oxygen, such as an oxide of nitrogen as $N_2O$, at a pressure less than atmospheric. From these known flash lamps the lamp according to the invention differs by the fact that foils of oxidizable substances, more particularly of metals and metal allows are used as a light producer which foils are so arranged in the bulb as to be in the range of an igniter.

Tests have proved that foils burn away at an extremely high speed, when the necessary oxygen or combination is present in sufficient purity and under suitable pressure. This rapid combustion takes place if the filling of the bulb contains the same percentage of oxygen as contained in atmospheric air. Now, the remarkable difference exists in the combustion, e. g. of aluminum foils in the free air taking place very slowly, so to say crawlingly, while it takes place with lightning speed in a bulb filled with pure oxygen under a pressure of 150 mm. Hg. As measurements have shown, in this case the average duration of the combustion amount to 1/40 second. The speed of the combustion can be increased by increasing the pressure of the oxygen. In this case the phenomenon is to be observed that the lightning effect of the metal foil when burned in atmospheric air amounts only to one hundredth of that obtained by burning the foil in an equal quantity of pure oxygen under a pressure of 150 mm. Hg. within the bulb, the pressure of the gas in the bulb then being reduced in the proportion of the percentage of oxygen in the atmospheric air, that is in the proportion of about 21 : 79.

Substances well suited to be used as foils are metals, metal alloys, and rare earths, such as aluminum, copper, iron, nickel, phosphor-bronze, cerium, zirconium, and also organic substances. The combustion of the foil may be initiated by any suitable igniting device.

In order that the invention can be more easily understood, a preferred embodiment of an electrically ignited flash lamp according to the invention is illustrated by way of example in the drawing, which shows a side view, partly in section, of the lamp.

The lamp has the shape of a normal electric incandescent lamp. The bulb 1 possesses the usual glass neck 2 with a sealed-in small tube 3 serving to draw off the air or to fill the bulb with the gas. The conducting wires $4^a$, $4^b$ are likewise sealed in the neck 2 and extend approximately up to the midst of the bulb. Near their upper ends the wires $4^a$, $4^b$ are held in place by means of a glass piece or rod 5 and are interconnected at their ends by an igniting wire 6. This wire 6 may be fitted with a small fulminating composition 7, to facilitate combustion. The space of the bulb 1 is loosely filled with foils 8 of an oxidizable substance as indicated above. With an equal weight of the foil filling the lighting effect and the speed of combustion of the filling are the greater, the smaller the thickness of the foils. The thickness of the metal foils amounts to about 0.0005 mm. The pressure of the oxygen in the bulb is between 120–180 mm. Hg.

The described lamp need not be equipped with any means for securing it against explosion when the bulb happens to become leaky. This resides in the fact that in case of leakiness of the bulb the combustion of the metal foil takes place very slowly so that a dangerous increase of pressure is avoided due to the heat of combustion being given off to the air surrounding the lamp. The only drawback of the lamp becoming leaky is that the lamp cannot be used as a flash lamp.

As can be seen from the foregoing, the igniting wire 6 and the composition 7, if any, burn away when electric current is supplied. The flame of the combustion ignites the surrounding foil filling 8. Of course, the filling must be within the range of the described igniter. The costs of production of the lamp are very low as the above-mentioned safety means may be dispensed with and the possibility is present to use very cheap foil material.

A further advantage of the described lamp resides in the fact that currents of a very low voltage can be used to ignite the foil filling, as foils are extremely easily inflammable due to their small thickness. The voltage of a normal pocket lamp battery is sufficient to cause ignition. This therefore affords the advantage of the use of the lamp without depending upon an electric supply system.

When used for photographic purposes, the bulb may be fitted inside or outside with a layer of a material, such as a yellow filter or tartrazin that absorbs a portion of the rays of the spectrum of the light emitted, or the bulb itself may be made of a material, such as yellow glass, having such an absorbing effect.

What I claim and desire to secure by Letters Patent is:—

1. A flash lamp particularly for photographic purposes, comprising a closed gas-tight transparent bulb containing an oxygen gas; and a foil in the bulb adapted to emit light upon combustion thereof with the oxygen and disposed within effective range of an ignition device.

2. A flash lamp particularly for photographic purposes, comprising a closed gas-tight transparent bulb containing an oxygen gas mixture; a foil in the bulb adapted to emit light upon combustion thereof with the oxygen and disposed within effective range of an ignition device; and a screen associated with the bulb for absorbing a portion of the rays of the spectrum.

3. A flash lamp particularly for photographic purposes, comprising a closed gas-tight transparent bulb containing a gas capable of yielding oxygen; and a foil in the bulb adapted to emit light upon combustion thereof with the oxygen and disposed within effective range of an ignition device, said bulb being adapted to absorb a portion of the rays of the spectrum.

4. A flash lamp particularly for photographic purposes, comprising a closed gas-tight bulb having a gas therein; an igniting device in said bulb; and a foil in the bulb adapted to emit light upon combustion thereof with the gas and disposed within effective range of the ignition device.

5. A flash lamp, comprising a bulb filled with a gaseous oxygenic substance at a pressure less than atmospheric; an igniting device in said bulb; foil of oxidizable substance in said bulb in the ignition range of said device; and a layer on said bulb of a substance adapted to absorb a portion of the rays of the spectrum.

6. A flash lamp, comprising a bulb filled with a gaseous oxygenic substance; an igniting device in said bulb; foil of oxidizable substance in said bulb in the ignition range of said device, said bulb being of a material adapted to absorb a portion of the rays of the spectrum.

7. A flash lamp, comprising a bulb filled with a gaseous oxygenic substance; an electric igniting device arranged in said bulb and comprising two conductors extending from the outside into said bulb and having an igniting wire between their ends within said bulb; foil of oxidizable substance in said bulb in the ignition range of said device; and means in connection with said bulb for absorbing a portion of the rays of the spectrum.

8. A flash lamp particularly for photographic purposes, comprising a closed gas tight transparent bulb containing an oxygen gas, and a loose filling of foil in the bulb adapted to emit light upon combustion thereof with the oxygen and disposed within effective range of an ignition device.

9. A flash lamp particularly for photographic purposes, comprising a closed gas tight bulb having a gas therein; an ignition device in said bulb; and a loose filling of foil in the bulb adapted to emit light upon combustion thereof with the gas and disposed within effective range of the ignition device.

10. A flash lamp particularly for photographic purposes, comprising a closed gas tight transparent bulb containing a gas at a pressure substantially below atmospheric and a loose filling of foil in the bulb adapted to emit light upon combustion thereof with said gas and disposed within effective range of an ignition device, the thinness of the foil being such that the foil will burn with lightning speed.

In witness whereof, I have hereunto set my hand.

JOHANNES OSTERMEIER.